(12) United States Patent
Huang

(10) Patent No.: US 6,357,180 B1
(45) Date of Patent: Mar. 19, 2002

(54) PUSH-PULL ROOT AIR-PRUNTING TRAY AND CONTAINER SYSTEMS

(76) Inventor: Barney K. Huang, 3332 Manor Ridge, Raleigh, NC (US) 27603

(*) Notice: Subject to any disclaimer, the term of this patent is extended or adjusted under 35 U.S.C. 154(b) by 0 days.

(21) Appl. No.: 09/181,731
(22) Filed: Oct. 29, 1998
(51) Int. Cl.⁷ ................................................ A01G 9/10
(52) U.S. Cl. ............................................................ 47/73
(58) Field of Search .............................. 47/58.1, 66.1, 47/66.2, 66.3, 73, 66.4, 65.5

(56) References Cited

U.S. PATENT DOCUMENTS

| | | | | |
|---|---|---|---|---|
| 100,300 A | * | 3/1870 | Ludlum | 47/73 |
| 515,032 A | * | 2/1894 | Vestal | 47/73 |
| 726,766 A | * | 4/1903 | Schaefer | 47/73 |
| 1,534,508 A | * | 4/1925 | Earp-Thomas | 47/66.2 |
| RE16,690 E | * | 7/1927 | Everett | 47/73 |
| 1,636,625 A | * | 7/1927 | Conrad | 47/73 |
| 4,106,235 A | * | 8/1978 | Smith | 47/73 X |
| 4,216,622 A | * | 8/1980 | Hollenbach et al. | 47/73 X |
| 4,497,132 A | * | 2/1985 | Whitcomb | 47/73 |
| 4,850,136 A | * | 7/1989 | Vollers | 47/66.2 X |
| 5,179,800 A | * | 1/1993 | Huang | 47/73 |
| 5,241,784 A | * | 9/1993 | Henry | 47/66.1 |
| 5,298,041 A | * | 3/1994 | Huang | 47/73 X |
| 5,983,565 A | * | 11/1999 | Chu | 47/65.5 X |

FOREIGN PATENT DOCUMENTS

| EP | 0 416 838 | * | 3/1991 | ................. 47/73 |
|---|---|---|---|---|
| EP | 0 758 524 | * | 2/1997 | ................. 47/73 |
| GB | 2 029 681 | * | 3/1980 | ................. 47/66 |
| WO | 93/03602 | * | 4/1993 | ................. 47/73 |

* cited by examiner

Primary Examiner—Peter M. Poon
Assistant Examiner—Jeffrey L. Gellner

(57) ABSTRACT

The present invention entails a plant/seedling/cutting/plug growing tray and container system that includes a tray with a plurality of individual plant cells and container with each cell and container having an open top and bottom and a detachable screen bottom, and that allows plant removal either from the open bottom of the tray/container or open top of the tray/container. As plant roots emerge through an open-bottom tray or container supported above ground, the roots shrivel due to contacting dry air and temporarily suspend their growth. This bare-root growth phenomenon is known as air pruning. Proper application of root air-pruning process in conjunction with the use of properly shaped tray-cells and containers (small at the top and gradually getting larger at the bottom) significantly increases plant production, improves crop quality and promotes mechanization. Air pruning alone without the right tray and container will not provide these benefits. The present invention which utilizes computer optimization techniques to determine the proper inner sidewall angle of tray-cells and containers also allows air-pruned plants to be manually or automatically removed from the open tops of tray-cells and containers. Alternatively, in one embodiment, the plant container consists of more than one piece of sidewalls which can be put together to form a plant container. In addition, the detachable screen is provided with a series of projecting legs designed for self-supporting so as to detachably secure the screen into the plant tray and container structure to facilitate root air pruning.

18 Claims, 6 Drawing Sheets

PUSH-PULL ROOT AIR-PRUNTING TRAY AND CONTAINER SYSTEMS

FIELD OF THE INVENTION

The present invention relates to plant trays and containers with a detachable screen structure for growing and handling air-pruned plants/seedlings/cuttings/plugs for superior plant growth and to increase agricultural and forestry plant production, including both greenhouse crops and field crops. It relates more particularly to a push-pull air-pruning tray and container structure that allows plant/seedling/cutting/plug removal either from the open bottom or open top of the trays and containers.

BACKGROUND OF THE INVENTION

Greenhouse utilization is increasing worldwide due to an ever increasing demand for improved crop quality, higher yield per unit area of production, reduced growing time, and reduced production costs. It is estimated that farmers as well as other segments of agriculture are faced with the challenge of producing three times as much food by the year 2040. The further challenge is to produce the extra food on no more land than farming uses today and with fewer environmental side effects than farming has today.

An integral part of greenhouse production is the use of trays and containers for growing plugs, seedlings, cuttings and plants. A common problem associated with traditional tray and containerized production is root tangling and root spiraling, commonly referred to as "root binding." Root binding results in various disadvantages, such as deterring root branching and development, slow and nonuniform growth in trays/pots/containers and after plugs/cuttings/seedlings/plants are transplanted, resulting in significant losses in profits for growers and farmers. Some industry people have been trying to resolve these disadvantages in plant growth, but the basic problems caused by the traditional design remain to be resolved.

In plant culturing practices and automation, the innovative plant root-air-pruning technologies invented by Dr. Barney K. Huang have demonstrated many advantages including: elimination of root-binding, promotion of properly oriented root-branching for increased root-mass and vigorous growth, shortened plant culturing periods, increased yields and quality, increased utilization cycles of greenhouse facilities, savings on growing medium, energy and fertilizer, thus decreasing pollution and improving the environment. The air-pruning tray design also utilizes the plant shoot characteristic that allows the foliage to fold together to go through the top opening as the plant is pulled from the bottom or pushed from the top. This plant characteristic lends itself to an easy dislodging of the plant from the open bottom and facilitates the fully automatic transplanting for labor savings. The root-air-pruning concept allows the development of unique tray systems and simple automated/robotic transplanting systems such as those disclosed by Dr. Barney K. Huang in U.S. Pat. Nos. 3,712,252 5,179,800, 5,254,140, 5,298,041 and 5,573,558. Air-pruning tray-cells/pots have open bottoms with detachable screens. The tray-cells/pots are larger at the bottom and smaller at the top to eliminate the inherent disadvantages of conventional tray-cells/pots that have a smaller closed bottom with drain hole(s) and a larger open top that makes the container-wall tapered outward toward the top resulting in improper wall angle to cause root binding, slow and nonuniform growth.

Numerous field tests indicate that air-pruned plants/seedlings/cuttings/plugs are significantly superior in growth performance both in the trays and after they are transplanted, and that effective fully automatic transplanting can be performed with the air-pruned seedlings for various crops. However, computer optimization technique based on the root development data was not incorporated into the air-pruning tray/container design until recently due to difficulties in obtaining such data and due to the need for a push-pull air-pruning tray and container system as disclosed in the present invention. Because of the difficulties in observing and measuring the actual mechanism of underground root development for qualitative and quantitative evaluation, there is very little information available on this subject matter even in the field of crop sciences, horticulture sciences, or in forestry. This is also due to the fact that many growers, farmers, researchers and extension agents often take commercially available conventional trays/pots/containers for granted without thinking how much the properly designed trays/pots/containers would affect their profits or research results. Many growers and farmers currently own transplanting machines and equipment which were designed for conventional trays/flats/pots/containers, yet, they want to use air-pruning trays/flats/pots/containers which provide them with increased plant production, quality and yields. Therefore, there has been and continues to be a need for air-pruning trays/flats/pots/containers that effectuate root air-pruning but will also allow the air-pruned plants/seedlings/cuttings/plugs to be removed from the top of air-pruning trays and containers.

SUMMARY AND OBJECTS OF THE INVENTION

The present invention entails plant growing air-pruning tray and container systems that are designed to improve overall performance and to overcome the disadvantages and shortcomings of the prior art. In particular, the air-pruning tray and container systems of the present invention are provided with tray-cell and container structure that allows plant removal either from the open bottom or open top of the tray/container. Among the various means disclosed is a detachable supporting screen provided with a series of projecting legs and which is press fitted or slide fitted to the tray/container structure to hold the tray above ground for effective root air pruning and to facilitate cycling watering of the tray culturing system. In one embodiment, the plant container consists of more than one piece of side walls which can be put together to form a self-watering plant container while the bottom screen, provided with a series of projecting legs designed to project into a water-holding bottom pan, is detachably secured to the plant container structure itself The air-pruning trays and containers can have a surrounding edge to hold a water level above the tray and container top so that it can also uniformly water the plants from top of the tray cells and containers.

It is therefore an object of the present invention to provide an air-pruning tray/container structure that allows plant removal either from the open bottom of the tray/container or open top of the tray/container.

Another object of the present invention resides in the provision of a plant tray/container structure with easily attachable and detachable supporting bottom screen that effectuates root air-pruning and which also functions to retain and confine the plant growing medium contained within the plant tray/container systems Another object of the present invention resides in the provision of a plant tray/container structure having a surrounding edge to hold water for self-watering, having a detachable screen, and to meet the requirements of plastic or metal forming processes for quality mass production at low cost.

A further object of the present invention is to provide air-pruning tray/container systems with increased rigidity that are self-supporting, relatively durable and maintenance-free, and made for easy handling and shipping of the air-pruned plants/seedlings/cuttings/plugs in the tray/container systems.

Still a further object of invention is to provide a plant tray/container system with an easily and quickly attachable and detachable bottom tray/container screen so that it can be adaptable to a fully automatic transplanter which requires easy handling of a large number of air-pruned seedlings.

Other objects and advantages of the present invention will become apparent and obvious from a study of the following description and the accompanying drawings, which are merely illustrative of such an invention.

TRADITIONAL OR CONVENTIONAL TRAYS/CONTAINERS CAUSE ROOT BINDING

Figure 2:
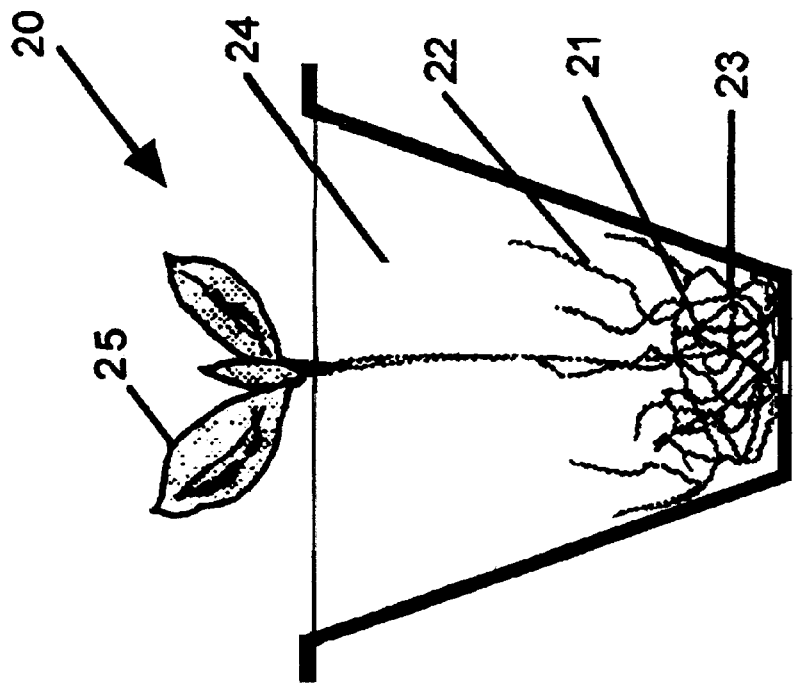
FIG. 2 is a sectional view of traditional or conventional basic tray-cell/pot/container, which is small at the closed bottom with drain hole(s) and gradually gets larger at the open top, illustrating the root binding, inferior root formation and plant growth, and ineffective use of cell/pot/container space and growing medium.

A common problem associated with traditional or conventional tray-cells, pots and containers is root binding due to their improper designs, which are small at the bottom and gradually get larger at the top generally indicated by the numeral 20 in FIG. 2. These designs provide for easy plant removal from the top without considering proper root physiology. For a conventional tray-cell/container, the first emerging plant root grows vertically down to the bottom of the tray cell. The root continues to elongate after reaching the bottom of the cell, spiraling around the cell bottom. Root branching and sub-branching occur at a much slower rate. As horizontally developed branched roots encounter the container side wall 21, they turn upwards 22 or sideways spiraling 23 around the wall 21 rather than downward, due to less-than-90-degree angles, to bend downward at the wall 21, while angles for bending sideways are 90° (for round cell) and angles for bending upward are more than 90°. This is the nature of root physiology to lead the roots to least restricted direction even though by nature roots would like to develop in downward direction. Tests showed that root tips could detect an angle less than 1 degree. This is an artificially imposed restriction against natural root development. Most of the branched roots continue to elongate, spiraling around near the cell bottom, so that the growing medium 24 in the cells is not fully used. If plugs/cuttings/seedlings/plants are left in a conventional tray/container for a longer period of time, severe root-binding results (see FIG. 2). This is particularly important for plug trays because the individual cells are very small.

Proper root orientation in the tray cells/containers is an important factor for future root development after transplanting. Plant roots in conventional tray-cells/pots/containers spiral and many are forced to grow upward resulting in root tangling, which hinders root development after transplanting. It is biotechnically crucial to elminate the above mentioned phenomena.

DETAILED DESCRIPTION OF THE DISCOVERY AND INVENTION

A plant system consists of shoots and roots. Shoots are the aboveground portions of a plant, which interact with the atmospheric environment. Depending on plant species and seasons, the shoot system can contain leaves, buds, flowers, fruits, stems, branches, and a trunk. Roots are the underground portions of the plant that interact with soil environment. The root system anchors the plant to the ground, holding it upright. It contains the main root, branches, sub-branches, root hairs and tips, which search for nutrients and water for plant growth. Each root tip has a protective cap that is pushed ahead as it grows. The shoot-to-root ratio of a plant system, dependent on the species and stage of development, usually remains constant. A larger root mass results in a larger plant.

Figure 3:
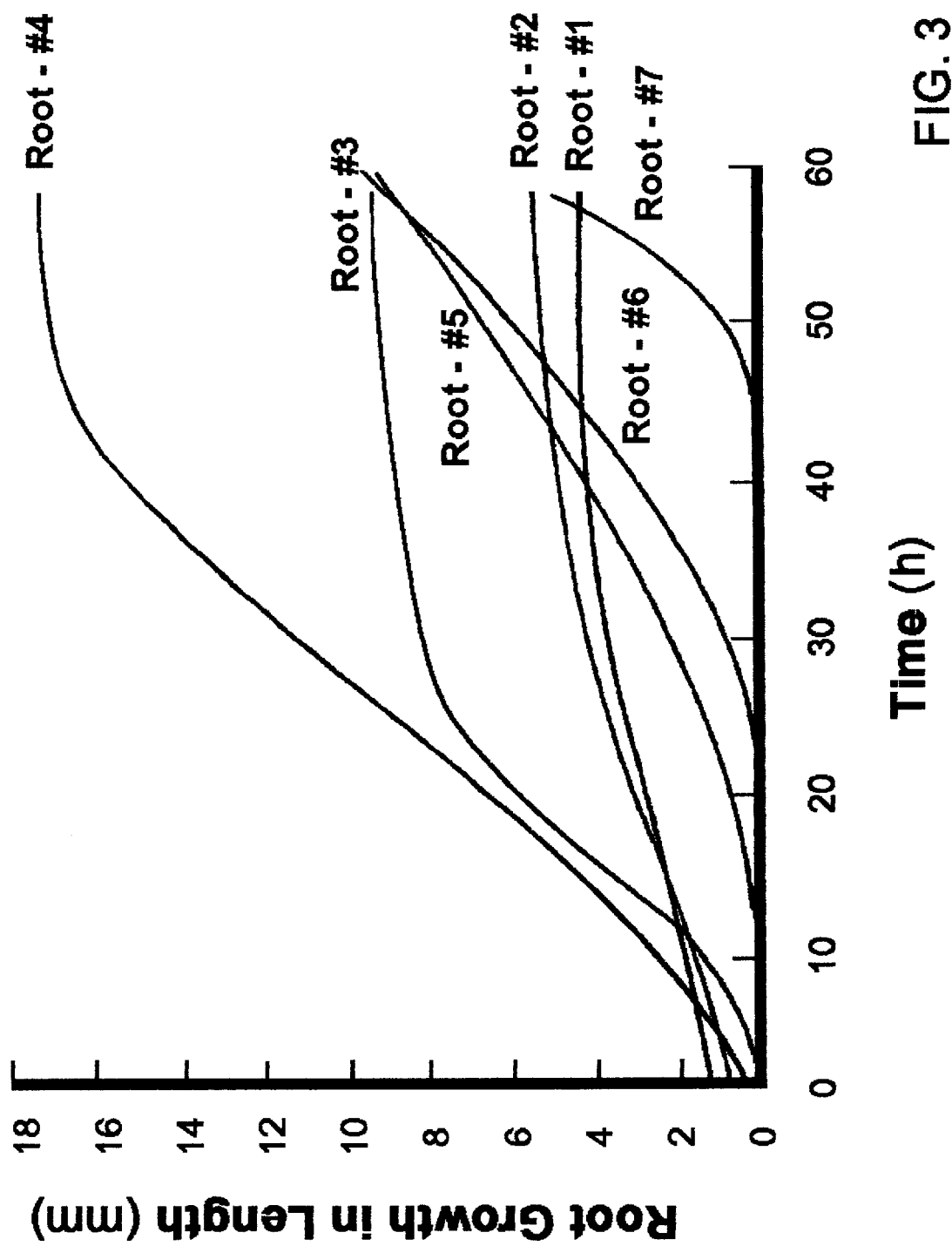
FIG. 3 is a representation of root-growth versus time curves for 7 individual roots illustrating various stages of S-shaped growth curves for over a 60-hour period. The old Roots #1 and #2 show slow-growth to non-growth stages of S-curves, Roots #3 and #4 show fast/exponential-growth to slow-growth stages of S-curves, and the younger Roots #5, #6 and #7 show the early stages of S-shaped growth curves.
Figure 3A:
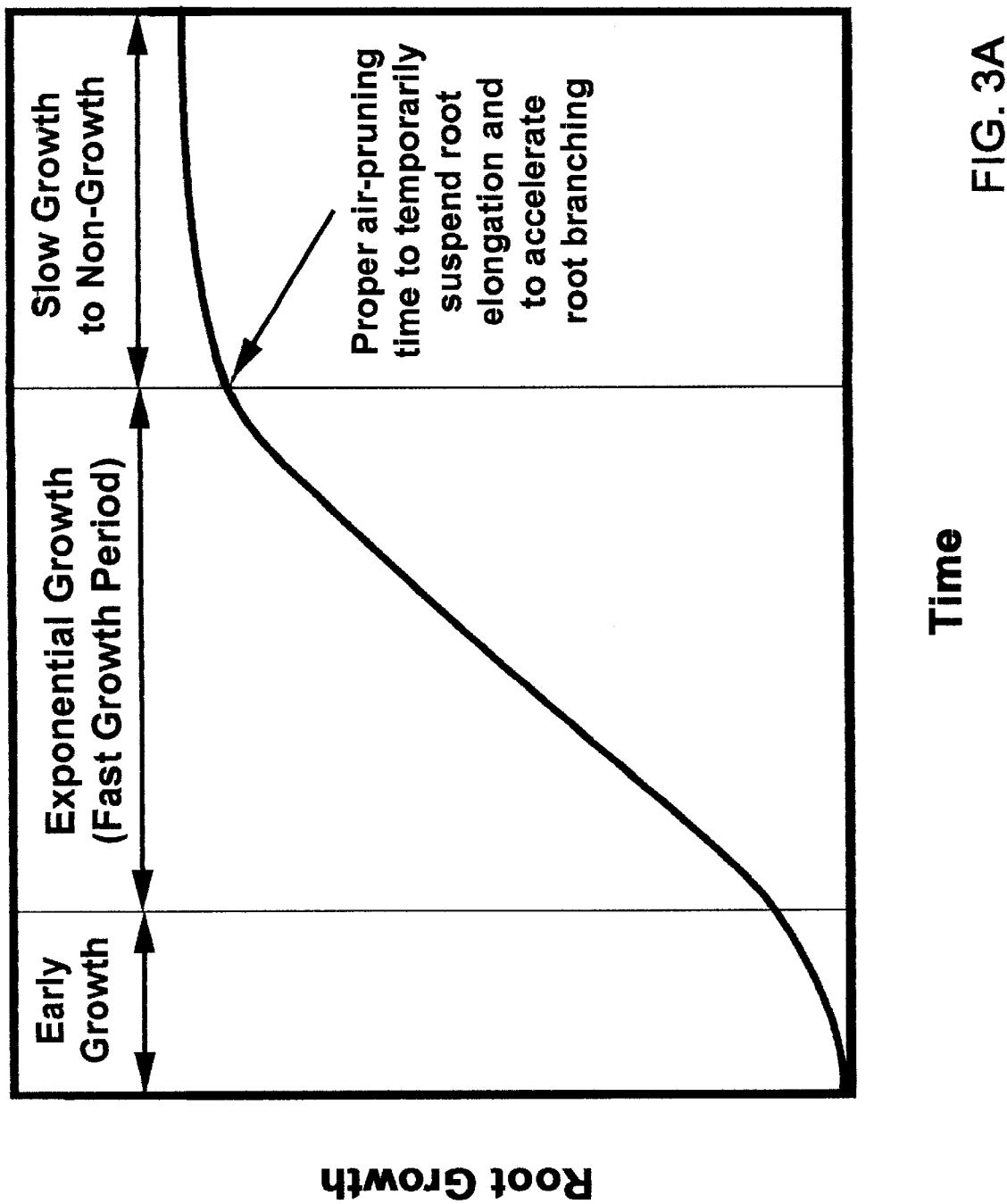

Plant growth systems can be described by discrete growth periods (emergence of new shoots and roots), within which growth is continuous (elongation and expansion of shoots and roots). The continuous growth period starts at a slow pace. Growth rate is accelerated following an exponential curve, and then it steadily declines until the shoots and roots reach their late growth stage of slow growth until growth ceases. Therefore, the continuous growth can be described by an S-shaped curve. Then, the discrete growth period starts again. It is interesting to note that the growth of each individual plant leaf or root follows a growth pattern of S-shaped curve, and that the root growth can be suspended at any portion of the growth curve to initiate the discrete growth. With reference to the drawings, FIG. 3 illustrates the growth curves (root length versus time) of 7 individual roots over a 60-hour period for a tomato seedling. The oldest root, Root #1, shows upper and plateau portions or slow-growth and non-growth portions of the S-curve. Roots #2 and #3 show the upper or slow-growth portion of the S-curve and the transition portion of the S-curve from the end of exponential growth to slow growth. Root #4 shows the entire exponential growth sections of the S-curve. Roots #5 and #6 show the lower portions of the S-curve starting with slow growth to accelerated exponential growth, and root #7 shows the initial segment of slow growth. Under ideal environmental conditions, the maximum root growth rate is reached in the early stage of growth following an exponential curve, and from the end of exponential growth, it steadily declines until the root reaches its late growth stage of slow-growth and non-growth. The total root growth can be obtained by superimposing the individual root growth at different development levels in different historical periods to form a larger S-shaped curve. This means that the continuous growth period of a plant-root growth system follows a pattern of S-shaped growth as exhibited by all biological growth systems including human and animals.

Since very early stage of plant root formation in the tray/pot/container has profound effects on the future root development and establishment as well as on the plant growth performance, crop quality and yields, a biotechnically advanced plant-culturing system is needed. This includes systems capable of culturing normal yet biotechnically altered plants through simple biophysical manipulation of plant root systems. Biotechnology in root-air-pruning utilizes plant system characteristics in conjunction with computer-aided design and system optimization of tray-cell/container configuration to eliminate root binding for proper and accelerated root formation. From the above analysis the following important factors must be considered for a push-pull air-pruning tray and container system.

A. Proper Container-Wall Angle—The main factor to cause root-binding is that conventional tray-cells/pots/containers have a small closed bottom with drain hole(s) and a larger open top which makes the container-wall tapered outward toward the top, causing the downward angle at the container-wall to be less than 90° as shown in FIG. 2. Therefore, this improper downward angle at the container-wall imposes restriction against natural root development, and must be corrected so that all roots can properly develop downwardly. The fundamental problem that needs to be resolved is the intersection angles between the tray-cell/pot/container wall and growing roots.

Figure 1:
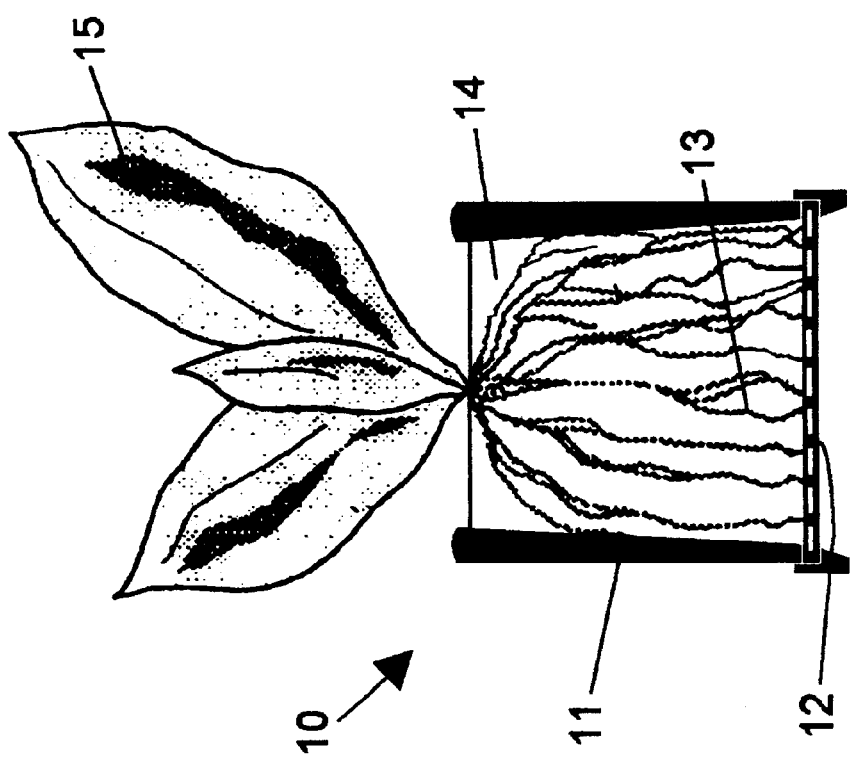
FIG. 1 is a sectional view of push-pull air-pruning basic tray-cell/pot/container system, which is larger at the open bottom and gradually gets smaller at the open top with detachable supporting screen bottom, of the present invention illustrating superior root formation and plant growth, and effective use of cell/pot/container space and growing medium.

It is a common misunderstanding to think that it is harder to remove the plants from trays/containers if the container wall is tapered inward toward the top, i.e., larger at the bottom and smaller at the top (FIG. 1). Even a plant with large shoot could be removed easily from the open bottom of trays/containers without any damage to the shoot. This is again a natural characteristic of a plant that the plant foliage 15 tends to fold together when the plant is pulled from the bottom and can pass through a small hole without difficulty. This plant characteristic lends itself to an easy dislodging of the plant from the open tray/container bottom and to fully automatic transplanting. No dislodging equipment (such as a mechanical dislodger) is required. Another advantage is that air-pruning trays filled with plugs/seedlings/cuttings/plants can be shipped in boxes without the fear of plants falling out from the larger top in conventional trays during shipping. This guarantees the quality of plugs/seedlings for supportive plug/seedling production systems in fully automated transplanting operations.

With the above mentioned advantages of an air-pruning tray/container in mind, a proper push-pull air-pruning tray/container can be design with computer optimization of the container wall angle in conjunction with experimental verifications, so that the plugs/seedlings can also be removed from the top as in conventional trays.

B. Proper Container Depth and Bottom Opening—Based upon the above mentioned discovery it becomes clear that tray/container depth and bottom opening are the important criterion related to effective utilization of the exponential portion of the S-shaped root growth curve to achieve a superior growth in a shortest period of time. For a conventional tray-cell/container (FIG. 2), the first root continues to elongate after reaching the cell bottom, avoiding the drain hole, spiraling around at the bottom following the entire S-shaped curve including the upper portion of the S-shaped curve of slow growth and non-growth. Therefore, branching and sub-branching occur at a much slower rate. Most of the branched roots continue to elongate to complete the entire S-shaped growth curves, spiraling around near the cell bottom or forced to grow upwards resulting in unhealthy root formation and root tangling (22 and 23). The growing medium 24 in the upper portion of cells is not fully utilized resulting in inferior growth and waste of growing medium 24. (FIG. 2). Effective binding of the growing medium 24 with roots cannot be achieved causing poor handling and gripping failure of plugs/seedlings. Therefore, the tray/container depth should be determine by the root growth curves of the plant (FIG. 3) so that the slow-growth and non-growth sections of the S-curve can be eliminated with a large open bottom for effective root air-pruning.

With further reference to the drawings, the push-pull air-pruning tray-cell/container system of the present invention is shown therein and indicated generally by the numeral 10 in FIG. 1. As will be appreciated from subsequent portions of this disclosure, the push-pull tray and container system 10 includes a main plant holding body 11 which has open top and bottom and is larger at the bottom and gradually gets smaller at the top with a detachable supporting screen bottom 12 shown in FIG. 1. The effectiveness of air-pruning in promoting root branching 13 is also illustrated in FIG. 1. In an air-pruning tray-cell/container, the first emerging plant root grows vertically down to the bottom of tray cell following a pattern of S-shaped growth. As it encounters the supporting screen 12 at the open bottom the root growth is temporarily suspended as soon as the root tip is exposed to the air. Once a root is air-pruned, the discrete growth process immediately causes the plant to start new root branches. Several branchings occur (discrete growth) near the media surface first in evenly distributed patterns in a horizontal direction. As root branches grow and encounter a cell wall they turn vertically downward or follow the sidewall toward the bottom of the tray cell, partially seeking better aeration, moisture and nutrients, and partially because the turning angles at the cell wall are more than 90° or the roots encounter least resistance. As soon as the root tips of those branches contact air at the bottom of the air-pruning tray their growth is temporarily suspended. In turn, new branching processes occur at those branches. Thus, the branching process continues to fill the tray-cell/container with properly oriented roots 13 in a short period of time, uniformly binding the growing media 14 in the cell/container with fine roots. Proper application of an air-pruning process to a root system can suspend the root growth at the end of the exponential growth portion of the S-shaped growth curve and facilitates new branching. As each branched root is air-pruned, new branches are initiated, thus promoting secondary root growth and eliminating root-binding, resulting in a larger root mass. As the suspension of root growth occurs just at the end of exponential growth and accelerated branching is repeated, the upper portion of S-shaped growth curves (slow growth stages) are effectively eliminated, resulting in faster root growth and branching, larger root mass, and accelerated superior plant growth. Since the shoot-to-root ratio of plant usually remains constant, a larger root mass results in a larger plant. FIGS. 1 and 2 respectively illustrate the significant difference between the shoot growth 15 of root air-pruning tray-cell/container and the shoot growth 25 of conventional tray-cell/container due to significantly larger root mass 13 of air-pruned plug/seedling/cutting/plant.

The effectiveness of root air-pruning in eliminating slow-growth and non-growth stages of the S-shaped curve and promoting plant root branching can best be enhanced by optimizing the depth of the main plant holding body 11 of push-pull tray and container based on the root growth data. This process can be achieved using computer logic by relating the root growth rate, cell size, branching and sub-branching rates, in several stages of air-pruned root development. Plug/seedling production can be maximized based on plant species, minimum root development time, cell/container depth and opening by enhancing root branching and accelerated plant growth in the tray-cells and containers and after the plants are transplanted.

Air-pruned plugs/seedlings ready for transplanting have a cell full of young and vigorous roots, and a cell bottom full of root tips that are ready to produce new roots as soon as the plugs/seedlings are transplanted. The air-pruned roots are similar to a brush hair, properly oriented downward. It should be emphasized that proper root orientation in the cells/pots/containers is an important factor for future root development after transplanting. In addition, air pruning is free and has no poisonous effects and works much better than container-applied chemicals that prevent root spiraling.

Figure 4:
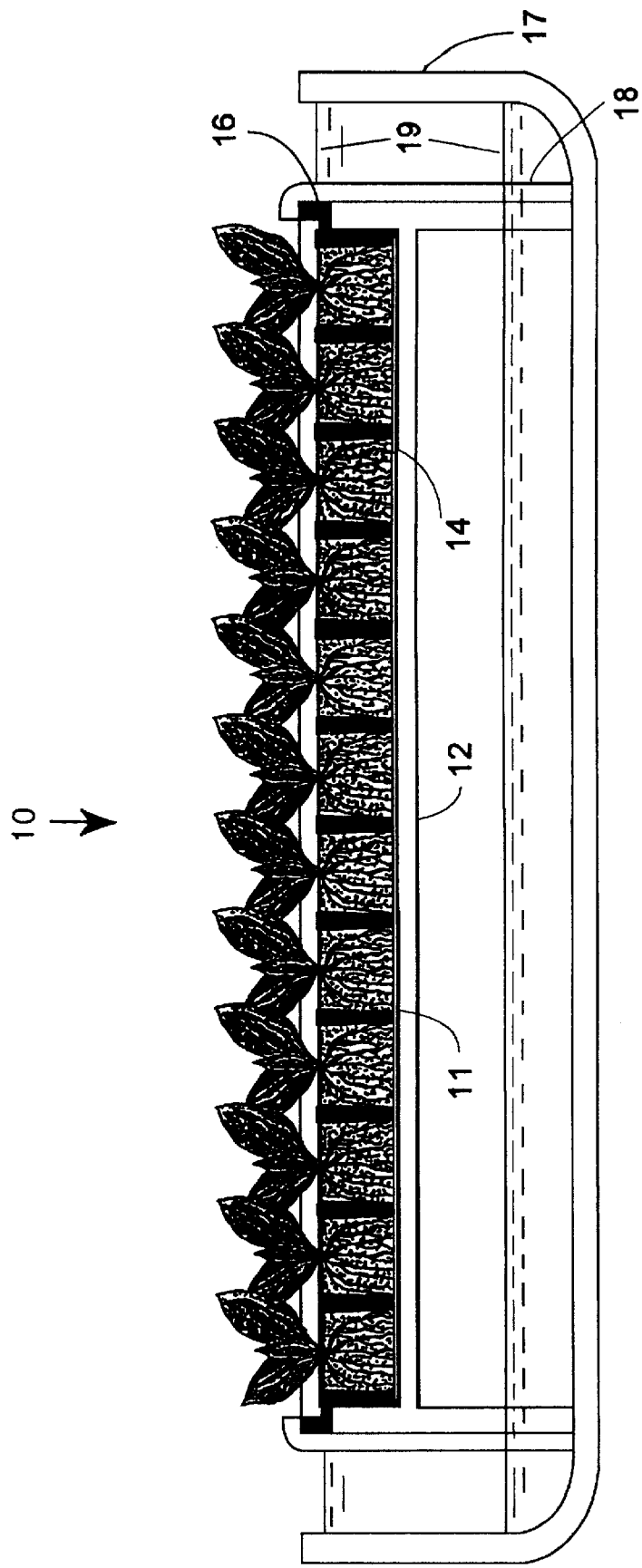
FIG. 4 is a sectional view of the push-pull air-pruning tray/container system with detachable supporting screen bottom, of the present invention illustrating its operational principle of cycling irrigation method to effectuate root air pruning by fluctuating the water/nutrient-solution level.

From the foregoing specification and discussion it will be appreciated that the present invention also entails a plant tray system that lends itself to air-pruning and automated transplanting but is provided with a bottom detachable screen 12 that assists in confining and holding the plant growing medium 14 within the plant tray structure 11. A push-pull air-pruning tray body 11 consists of a plurality of aligned and uniformly spaced cells shown in FIG. 4. The air-pruning tray 11 can have a surrounding edge 16 to hold a water level above the tray top so that it can uniformly water the plants from top of the tray cells. It is appreciated that any conventional plant-growing medium 14 can be utilized in the push-pull tray and container system 10 of the present invention. In use, it should be appreciated that the tray/container system 10 can be filled with plant-growing medium 14 from the top with the bottom screen 12 attached on the main body 11. The tray/container system 10 can be seeded, germinated and grown to a transplanting size with effective air pruning of roots for enhanced plant growth.

A detachable screen 12 (FIG. 4) secured to the bottom of the push-pull tray/container plant holding body 11 to provide root air pruning, can be conveniently removed from the plant holding body 11 for easy removal of the individual plants from the bottom. However, the optimized inner angle of plant holding body 11 allows air-pruned plugs/seedlings/cuttings to be pulled out from the top and also allows that all roots can properly develop downwardly.

The push-pull air-pruning tray body 11 of the present invention can also be used in an automatic transplanting operation. To accomplish this, the screen 12 can be detached from the bottom of the tray body 11 so as to leave the bottom of the plant tray open. This allows a tray structure to be used in a manner where the respective plants in each cell are pulled from the bottom of the plant tray structure 11 by the fully automatic transplanters such as that disclosed by Dr. Barney K. Huang in U.S. Pat. No. 5,573,558. The plants can also be removed from the top by manual or mechanical means as used by a conventional transplanter.

Disclosed herein the detachable screen 12 can be provided with a series of supporting legs 18 to project onto a water-holding bottom pan 17 (FIG. 4), and is press fitted or slide fitted to the tray structure 11 to hold the growing medium 14 and to provide effective air pruning of the plant roots 13 and facilitate cycling watering of tray culturing system. The water/nutrient level 19 can be raised and lowered in the pan 17 for watering at high level and for root air pruning at lower level. Of course, a push-pull air-pruning tray/container system can be watered using any conventional watering systems, such as overhead spray, misting, etc.

Figure 6:
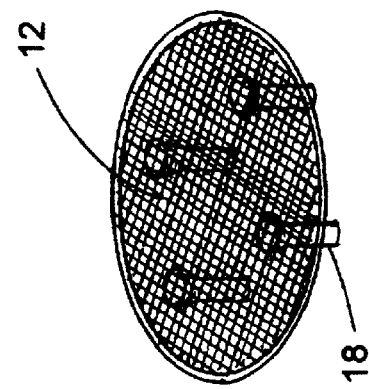
FIG. 6 is a perspective view of a detachable supporting screen bottom of the present invention.
Figure 5:
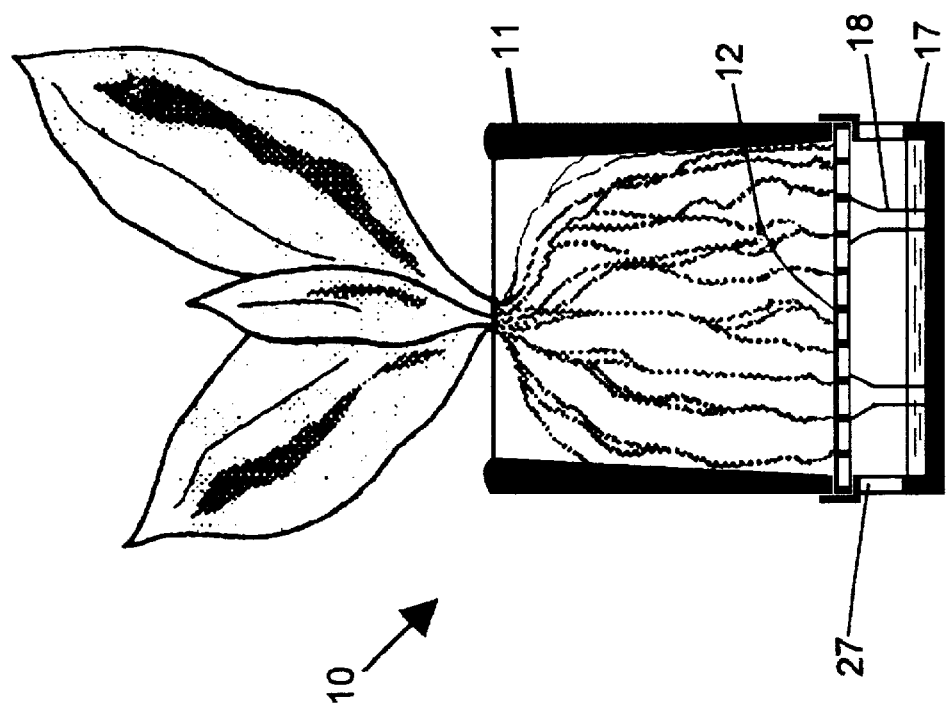
FIG. 5 is a sectional view of air-pruning pot/container system with detachable supporting screen bottom and the water/nutrient-solution holding pan of the present invention.

Turning now to FIG. 5 and another embodiment of the present invention, the lower portion of container plant holding body structure 11 is provided or integrated with a water-holding bottom pan 17 and airflow openings 27. A screen plate 12 is provided with a series of supporting legs 18 to project onto a water-holding bottom pan 17 as illustrated in FIGS. 5 and 6. The airflow openings 27 allow the air to flow freely underneath the screen plate 12 to effectuate root air pruning. A series of supporting legs 18 projecting onto a water-holding bottom pan 17 also provide automatic watering to the air-pruned root system by capillary action as long as the water/nutrient solution is maintained in the bottom pan 17. Of course, the air-pruning pot/container system can be watered from the top or from the airflow openings 27, and the water-holding bottom pan 17 serves to catch any extra water as a bottom dish used for a conventional pot/container. In use, the screen plate 12 (FIG. 6) can be inserted into the bottom of the container body 11 as illustrated in FIG. 5. It is appreciated that the inner angle of the container body 11 is optimized so that it can provide effective air pruning of roots for enhanced plant growth and the plant can be pulled out from the container top. It is also appreciated that the screen plate 12 (FIG. 6) can be inserted into the bottom of a conventional pot/container with side drain holes to eliminate some root binding to improve the growth performance.

Figure 8:
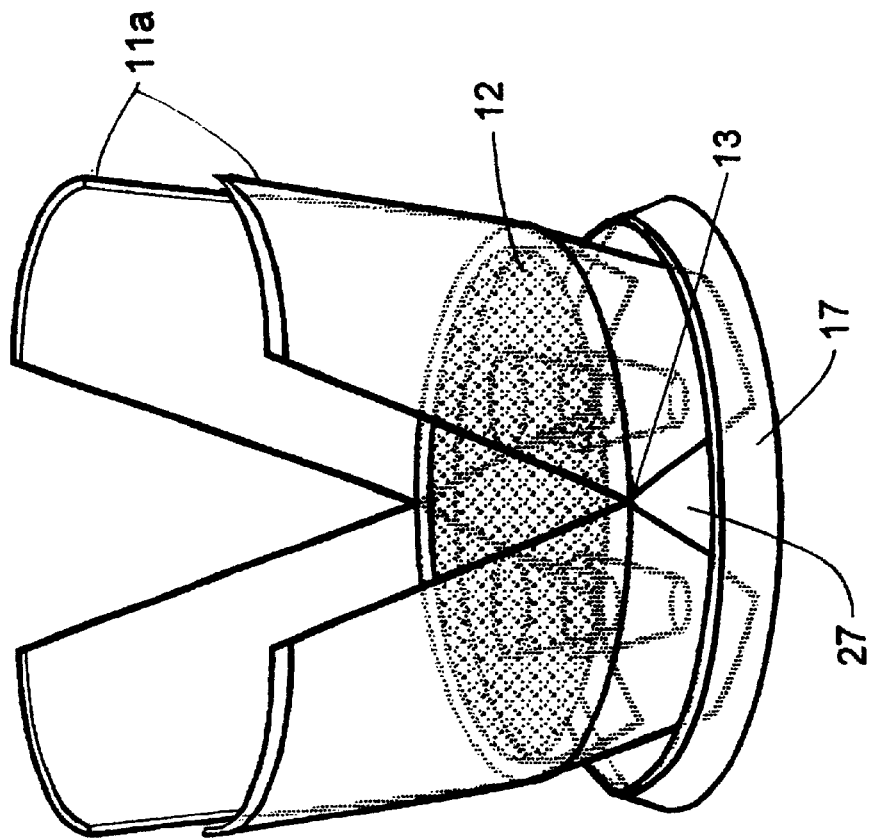
FIG. 8 is a perspective view of a disassembled air-pruning pot/container system with detachable supporting screen bottom and the water/nutrient-solution holding pan of the present invention.
Figure 7:
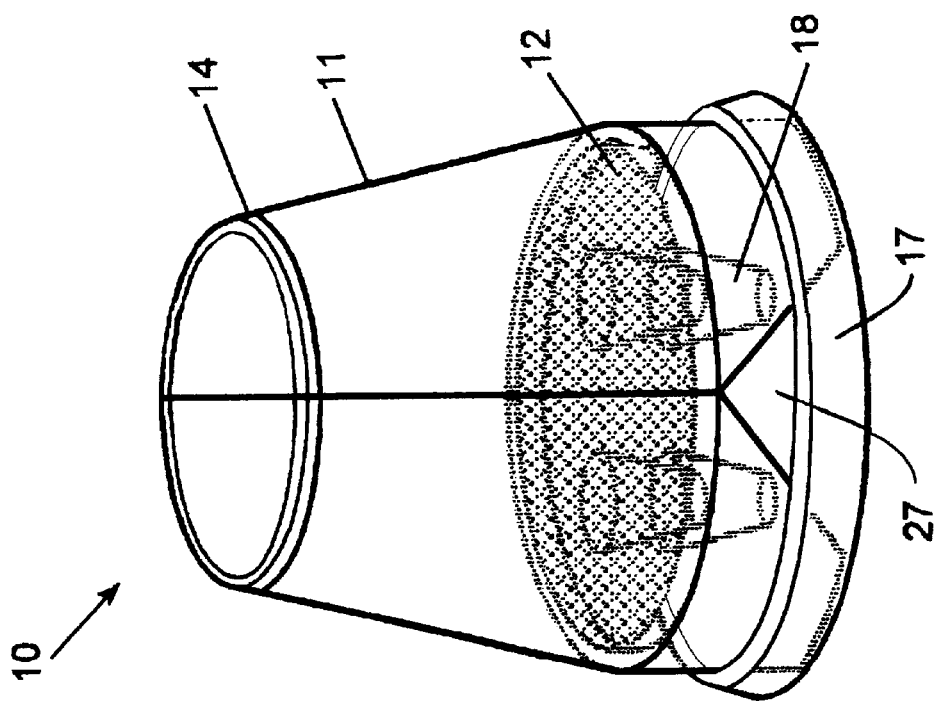
FIG. 7 is a perspective view of a disassemblable air-pruning pot/container system with detachable supporting screen bottom and water/nutrient-solution holding pan of the present invention.

In FIGS. 7 and 8, yet another embodiment of the present invention is shown and in this embodiment, the air-pruning pot/container system consists of a disassemblable pot/container body 11 with detachable supporting screen plate 12 and water/nutrient solution holding pan 17. In this embodiment, the main body 11 consists of more than one element of sidewall 11a which can be put together or assembled to form a pot/container body 11 of any shape (round, square, pentagon, etc.). The color of each element or of some elements 11a can be different to form a decoratively designed pot/container. The lower portion of each element 11a can be hinged at points 13 so that as the top portion of all elements 11a are clamped together with a clamp 14 as shown in FIG. 7 the lower end of each element 11a is securely held by the surrounding edge of water/solution holding pan 17 to form an air-pruning pot/container system 10 similar to the one shown in FIG. 5. In the embodiment illustrated in FIGS. 7 and 8 the screen plate 12 is held at the level of points 13 so that the air can flow freely through airflow openings 27 and underneath the screen plate 12 to effectuate root air pruning. In practice the screen plate 12 is disposed on the water/solution holding pan 17 so that the top portions of all elements 11a are clamped together with a clamp 14 to form an assembled air-pruning pot/container system 10 shown in FIG. 7. The air-pruning pot/container system 10 can be disassembled by releasing the clamp 14, then opening sidewall elements 11a as illustrated in FIG. 8 for easy removal of the plant-soil system by pushing downward with the supporting screen plate 12 or simply pulling upward to function as a push-pull air-pruning pot/container system. The water-holding bottom pan 17 together with supporting screen plate 12 and hollow supports 18 provide automatic watering to the air-pruned root system by capillary action through the hollow supports 18 as long as the water/nutrient-solution is maintained in the bottom pan 17.

From the foregoing specification and discussion it is appreciated that the present invention entails the new discovery on the plant root characteristics and a plant tray/pot/container structure as well as their biophysical interactions that lends itself to proper root air-pruning based on S-shaped root growth curves of FIG. 3 for superior plant growth, higher crop yields and quality. The invention also allows the air-pruned plants/seedlings/cuttings/plugs to be removed from the top or bottom of air-pruning tray and container systems. Having thus described the preferred embodiments, it is manifest that many changes can be made in the details of construction arrangement and fabrication.

The present invention may, of course, be carried out in other specific ways than those herein set forth without departing from the spirit and essential characteristics of the invention. The present embodiments are, therefore, to be considered in all respects as illustrative and not restrictive, and all changes coming within the meanings and equivalency range of the appended Claims are intended to be embraced therein.

What is claimed is:

1. A push-pull air-pruning plant container system comprising:
   a plant holding structure having an open top and an open bottom and a sidewall, the sidewall inwardly tapered toward the open top;
   a plant growing in a medium in the structure, the plant with roots and capable of being removed from the open top or open bottom;
   a screen removably attached to the bottom end for retaining the growing medium;
   wherein, the depth of the structure corresponds to the particular length of the root system of the plant growing in the structure such that air pruning at the open bottom occurs when the roots are approximately at the end of their maximum growth rate.

2. The push-pull air-pruning plant container system of claim 1 wherein the plant holding structure includes a plurality of aligned and uniformly spaced basic containers integrated together to form a tray body for holding a plurality of plants and growing media which can be removed by pushing downward or pulling upward; and a free-standing screen or a screen detachably secured to the open bottom of the plant tray body, to form a unitary tray-screen system for retaining the plants and growing media and for giving rise to root air pruning.

3. The push-pull air-pruning plant container system of claim 1 wherein the container inner-sidewall angle is optimized based on the intersection angles between the inner-sidewall and growing roots and allowing plant removal either from the open bottom or open top of the plant holding structure.

4. The push-pull air-pruning plant container system of claim 1 wherein the depth of the plant holding structure is optimized so that the air-pruning process can be applied to plant roots to temporarily suspend the root growth at the end of exponential growth stage of the S-shaped growth curve and to facilitate new branching and accelerated growth, allowing the plants to grow at fast/exponential rate.

5. The push-pull air-pruning plant container system of claim 1 wherein said free-standing screen or detachable screen plate is provided with approximately 50% or more openings to prevent root tips from avoiding direct air contact and to achieve the effective air pruning of plant roots.

6. The push-pull air-pruning plant container system of claim 2 wherein said free-standing screen or detachable screen plate is provided with approximately 50% or more openings to prevent root tips from avoiding direct air contact and to achieve the effective air pruning of plant roots.

7. The push-pull air-pruning plant container system of claim 1 wherein the free-standing screen or detachable screen is provided with one or more solid or hollow supports to support the plant holding structure and plant-root system above the ground to allow the air to flow freely underneath the screen to effectuate root air pruning.

8. The push-pull air-pruning plant container system of claim 2 wherein the free-standing screen or detachable screen is provided with one or more solid or hollow supports to support the plant holding structure and plant-root systems above the ground to allow the air to flow freely underneath the screen to effectuate root air pruning.

9. The push-pull air-pruning plant container system of claim 1 wherein the system includes a detachable or integrated water-holding bottom pan which provides automatic watering of the plant-root system by capillary action as long as the water/nutrient-solution is maintained in the bottom pan.

10. The push-pull air-pruning plant container system of claim 1 wherein the system includes a detachable or integrated sidewall structure joining with plant holding body and/or water-holding bottom pan, having airflow openings on the sidewall structure so that the air can flow freely underneath the screen to effectuate root air pruning.

11. The push-pull air-pruning plant container system of claim 1 further comprising; a disassemblable plant holding structure; a detachable supporting screen; and a water/nutrient-solution holding pan.

12. The push-pull air-pruning plant container system of claim 11 wherein said disassemblable plant holding structure consists of more than one element of plant holding structure which can be put together or assembled to form a plant holding structure body to facilitate plant removal from the container system by pushing downward or pulling upward.

13. The push-pull air-pruning plant container system of claim 11 wherein at least one element of said plant holding structure is of a different color so that they can form a decoratively designed plant container system as they are put together or assembled to form a plant holding structure body.

14. The push-pull air-pruning plant tray container system of claim 2 wherein said detachable securing means include slide flanges formed around a selected portion of the plant tray structure and wherein the screen includes a slide groove that extends from the screen and is adapted to be confined about the slide flanges such that the screen may be supported by the slide flanges while also allowing the screen to be removed from the plant tray structure by sliding the screen from the tray structure.

15. The push-pull air-pruning plant tray container system of claim 2 wherein the surrounding edge structure of the plant tray structure is designed to hold water above the tray-cell top so that respective plants in the plant cells can be uniformly watered from the top of the tray structure and also designed for nesting of said unitary tray-screen systems.

16. The push-pull air-pruning plant tray container system of claim 2 wherein the detachable screen is provided with one or more supports to project onto a water-holding bottom pan and is press fitted or slide fitted to the tray structure to hold the plants and growing medium above water level to provide effective root air-pruning for cycling irrigation of tray culturing system by varying the water/nutrient level in the pan for watering at high level and for root air- pruning at lower level.

17. The push-pull air-pruning plant tray container system of claim 2 wherein the system is charged with water, and the water held within said tray system gives rise to a generally uniform temperature throughout the plant-tray container system.

18. The push-pull air-pruning plant tray container system of claim 2 wherein the detachable screen can be removed from the bottom of said tray body so as to leave the bottom of the plant-tray open, such that respective plants can be extracted downwardly or upwardly from said plant-tray in a manual, semiautomatic or fully automatic transplanting operation.

* * * * *

UNITED STATES PATENT AND TRADEMARK OFFICE
CERTIFICATE OF CORRECTION

PATENT NO. : 6,357,180 B1 Page 1 of 1
DATED : March 19, 2002
INVENTOR(S) : Huang It is certified that error appears in the above-identified patent and that said Letters Patent is hereby corrected as shown below:

Title page, Item [54] and Column 1, line 1,
Change "AIR-PRUNTING" to -- AIR-PRUNING --

Signed and Sealed this

Third Day of September, 2002

*Attest:*

*Attesting Officer*

JAMES E. ROGAN
*Director of the United States Patent and Trademark Office*